United States Patent [19]

Bickl et al.

[11] Patent Number: 4,492,458
[45] Date of Patent: Jan. 8, 1985

[54] METHOD OF AND ARRANGEMENT FOR COPYING A COLORED ORIGINAL

[75] Inventors: Horst Bickl, Pullach; Günter Findeis, Sauerlach; Helmut Treiber, Munich, all of Fed. Rep. of Germany

[73] Assignee: Agfa-Gevaert AG, Leverkusen, Fed. Rep. of Germany

[21] Appl. No.: 421,500

[22] Filed: Sep. 22, 1982

[30] Foreign Application Priority Data

Dec. 30, 1981 [DE] Fed. Rep. of Germany ....... 3151939

[51] Int. Cl.³ .............................................. G03B 27/80
[52] U.S. Cl. .......................................... 355/38; 355/77
[58] Field of Search ..................................... 355/35–38, 355/77, 83

[56] References Cited

U.S. PATENT DOCUMENTS

| 4,101,216 | 7/1978 | Grossmann | 355/38 X |
| 4,101,217 | 7/1978 | Fergg et al. | 355/38 |
| 4,152,068 | 7/1979 | Bickl et al. | 355/38 |
| 4,406,538 | 9/1983 | Bühler | 355/38 X |

Primary Examiner—L. T. Hix
Assistant Examiner—Della J. Rutledge
Attorney, Agent, or Firm—Peter K. Kontler

[57] ABSTRACT

A method of copying a colored original involves measuring the transparency of localized regions of the original in each of the three primary colors. Three localized transparency ratios for each region are formed from the transparency values for the different colors. Three corresponding average transparency ratios for the original as a whole are computed from the localized transparency ratios. Each average transparency ratio is compared with a statistical average of similar ratios obtained from a large number of average originals. If an average transparency ratio of the original to be copied deviates from the corresponding statistical average by more than a predetermined amount, the number of each of the localized transparency ratios lying inside and outside of a predetermined range about the corresponding average transparency ratio of the original is counted. When the number outside of a predetermined range exceeds the number inside, a color dominant is assumed to be present in the original. Otherwise, a color tinge is assumed to be present. The original is copied using a correction factor which depends upon whether a color dominant or a color tinge is present. An alternative method summing the differences between the localized transparency ratios and the respective average transparency ratios of the original is also presented.

40 Claims, 8 Drawing Figures

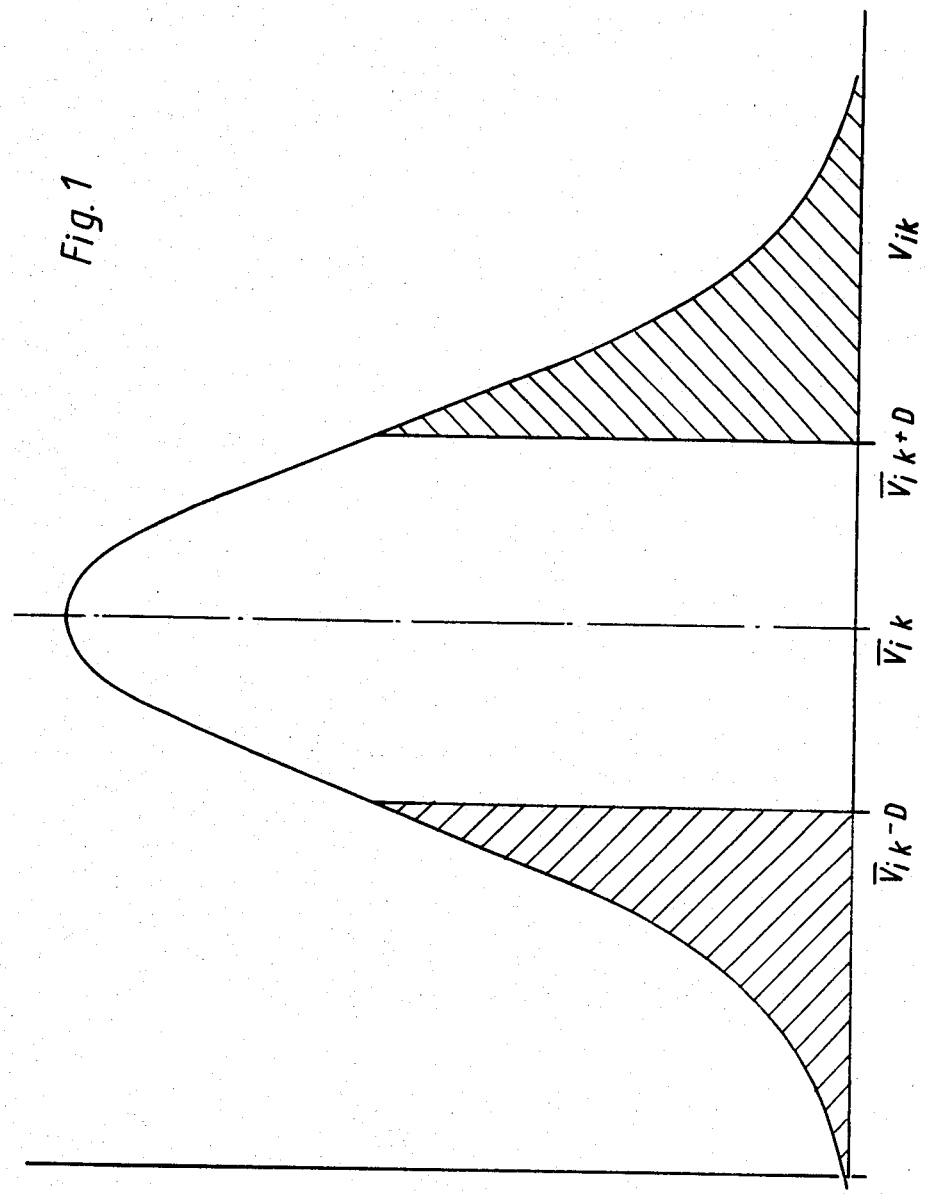

METHOD OF AND ARRANGEMENT FOR COPYING A COLORED ORIGINAL

BACKGROUND OF THE INVENTION

The invention relates generally to a method of and an arrangement for copying a colored original.

More particularly, the invention relates to a method of and an arrangement for determining the amount of light required in each of the three primary colors during the copying of a colored original.

In color copying, the so-called neutral gray correction may be used to eliminate color tinges or casts due to the nature of the material, e.g., paper or exposed and developed film, constituting the original to be copied. The neutral gray correction is performed by using a photoelectric measuring device to regulate the exposure of the original in each of the three primary colors. The amounts of light in the primary colors are selected in such a manner that the copy is a neutral gray on average.

When the subject matter of the original has so-called color dominants, that is, intensively colored areas, use of the neutral gray correction during automatic exposure control results in poor copies. The reason is that the neutral gray correction then leads to color falsification in the copies.

Accordingly, the neutral gray correction should not be employed when color dominants are present. This raises the problem of distinguishing between color tinges and color dominants.

The German Auslegeschrift No. 25 35 034 discloses a photographic color copying apparatus having a photoelectrically controlled exposure control unit. Different regions of the original are scanned individually to determine the color compositions thereof and relationships between the three primary colors are established for each of the regions. When a clear color imbalance exists in one or more regions, special procedures are employed to eliminate the color dominants from the calculations which are used to determine the neutral gray correction factor. One such procedure involves using only measurements from regions having a proper color balance in the determination of the neutral gray correction factor.

When large regions of an original have a color imbalance, the preceding procedure exhibits the disadvantage that the neutral gray correction factor, and hence the exposures in the different colors, are based upon a relatively small proportion of the original.

OBJECTS AND SUMMARY OF THE INVENTION

It is an object of the invention to provide a method and an arrangement which make it possible to obtain color copies of good quality even though the original may have a color tinge and/or a color dominant.

Another object of the invention is to provide a method and an arrangement which enable automatic exposure control during copying of a colored original to be based on an evaluation of the entire original.

An additional object of the invention is to provide a method and an arrangement which make it possible to automatically distinguish between a color tinge and a color dominant.

The preceding objects, as well as others which will become apparent as the description proceeds, are achieved by the invention.

One aspect of the invention resides in a method of copying a colored original. The method involves sensing selected regions of the original to obtain at least one color-dependent parameter having a first magnitude characteristic of at least the major part of the original and a plurality of second magnitudes which are respectively characteristic of the selected regions. The deviation of the first magnitude from a reference magnitude is determined. When this deviation exceeds a predetermined amount, the first magnitude is compared with the second magnitudes. The probable source of the deviation is established by calculating a value representative of such source from the results of the comparison between the first and second magnitudes and then relating this representative value to a reference value. The original is subsequently copied under conditions depending upon the probable source of the deviation.

The reference magnitude for the color-dependent parameter may be an average of magnitudes similar to the first magnitude obtained from a large number of originals. The originals from which the reference magnitude is derived are preferably similar to the original being copied, that is, are preferably composed of the same material as the original being copied.

The operation of establishing the probable source of the difference between the first and reference magnitudes of the color-dependent parameter may involve a determination of whether a color tinge or a color dominant is present.

The color-dependent parameter may be a ratio of the transparencies of the original in two of the primary colors.

The transparency of the original in each of the three primary colors, namely, red, blue and green, may be measured during the sensing operation. Three transparency ratios may then be formed, e.g., ratio of transparencies in blue and green; ratio of transparencies in green and red; and ratio of transparencies in red and blue. Each such ratio will have a first magnitude characteristic of the major part or of the entire original and a plurality of second magnitudes which are respectively characteristic of the individual regions.

The first magnitude for each transparency ratio may be compared with a reference magnitude for such ratio. The reference magnitude for a particular transparency ratio represents an average of magnitudes which are similar to the first magnitude and are derived from a large number of colored originals. The reference magnitude for a transparency ratio is, of course, an average of magnitudes for the same transparency ratio.

In accordance with the invention, if the deviation of the first magnitude from the reference magnitude exceeds a predetermined amount for even one of the transparency ratios, the operation of comparing first and second magnitudes is performed for each of the transparency ratios. The operation of establishing the probable source of a deviation is also performed for any transparency ratio which it is applicable.

The original is copied under conditions depending upon the probable source of the deviation or deviations. The copying operation may involve regulation of the amount of copying light in each of the three primary colors.

It will be observed that transparency ratios for individual regions of the original are used to derive information relating to the distribution of colors throughout the original.

Another aspect of the invention relates to an arrangement for copying a colored original. The arrangement comprises sensing means for sensing selected regions of the original and emitting signals representative of a characteristic of the original in a primary color. Processing means is arranged to receive the signals from the sensing means and to: (a) derive from the signals at least one color-dependent parameter having a first magnitude characteristic of at least the major part of the original and a plurality of second magnitudes which are respectively characteristic of the selected regions; (b) determine the deviation of the first magnitude from a reference magnitude for the color-dependent parameter; (c) compare the first and second magnitudes when the deviation exceeds a predetermined amount; (d) calculate a value representative of the probable source of the deviation from the results of the comparison between the first and second magnitudes; and (e) establish the probable source by relating the representative value to a reference value. Copying means responsive to the processing means is designed to copy the original under conditions depending upon the probable source of the deviation.

The sensing means may be designed to measure the transparency of the original in each of the three primary colors. The processing means may then be operative to develop three color-dependent parameters, namely, three different transparency ratios.

The processing means may include a computer as well as a memory which is connected to the computer and serves to store the magnitudes of the transparency ratios. The sensing means may be connected both to the computer and the memory.

The processing means may be designed so that the operation of comparing first and second magnitudes is carried out for each of the transparency ratios as soon as the first magnitude of one such ratio deviates from the respective reference magnitude by more than a predetermined amount. The processing means may be further designed so that, where applicable, the operation of calculating a value representative of the probable source of a deviation, as well as the operation of establishing the probable source, are performed for each of the transparency ratios even though the first magnitude of only one such ratio deviates from the corresponding reference magnitude by more than a predetermined amount.

The processing means may be arranged so that the operation of establishing a probable source involves a determination of whether a color tinge or a color dominant is present.

The processing means may be designed so as to be capable of determining the conditions under which the original should be copied once the probable source of a deviation has been established. Such a determination may involve calculation of the amount of light in each of the three primary colors to which the original is to be exposed during copying.

The novel features which are considered as characteristic of the invention are set forth in particular in the appended claims. The improved copying method and arrangement, however, will be best understood upon perusal of the following description of certain specific embodiments with reference to the accompanying drawings.

BRIEF DESCRIPTION OF THE DRAWINGS

FIG. 1 is a graph illustrating the expected distribution of the transparency ratios of a large number of colored originals;

DESCRIPTION OF THE PREFERRED EMBODIMENTS

Figure 2A:
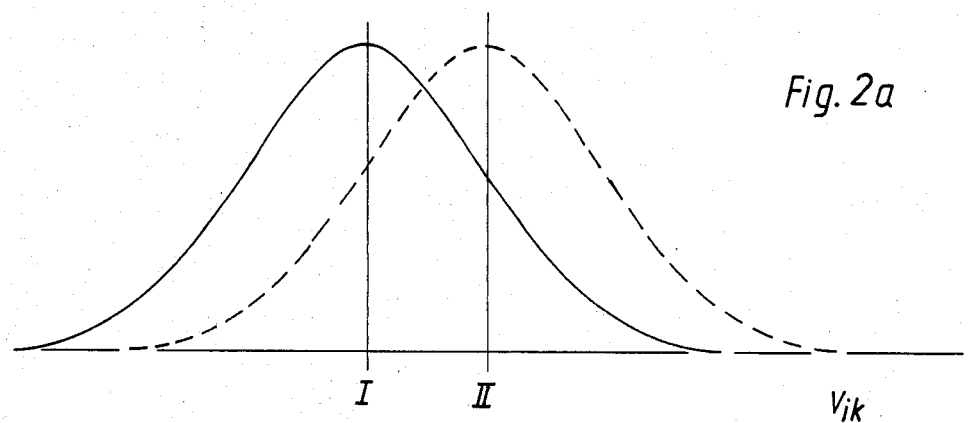
FIGS. 2A–2C illustrate the effects of a color tinge and a color dominant on the distribution of the transparency ratios within a colored original.

As outlined previously, the invention employs one or more color-dependent parameters. By way of illustration, and not by way of limitation, such color-dependent parameters are here assumed to be transparency ratios, that is, ratios of the transparencies of a colored original in the primary colors.

The following definitions will be used herein:

(1) $V_{bg}$ = average or overall value of the ratio of the transparency of an original in blue to the transparency of the original in green = $T_b/T_g$, where $T_b$ = transparency of the original in blue and $T_g$ = transparency of the original in green.

(2) $V_{gr}$ = average or overall value of the ratio of the transparency of an original in green to the transparency of the original in red = $T_g/T_r$, where $T_r$ = transparency of the original in red.

(3) $V_{rb}$ = average or overall value of the ratio of the transparency of an original in red to the transparency of the original in blue = $T_r/T_b$.

(4) $V_{ik}$ = average or overall value of the ratio of the transparency of an original in color i to the transparency of the original in color k = $T_i/T_k$, where $T_i$ = transparency of the original in color i, and $T_k$ = transparency of the original in color k.

i = b, g, r
k = g, r, b (5) $\overline{V}_{bg}$ = statistical average value of $V_{bg}$ for a large number of originals which are free of color tinges and color dominants and are similar to the original being copied, i.e., are made of the same material as the original being copied.

(6) $\overline{V}_{gr}$ = statistical average value of $V_{gr}$ for a large number of originals which are free of color tinges and color dominants and are similar to the original being copied.

(7) $\overline{V}_{rb}$ = statistical average value of $V_{rb}$ for a large number of originals which are free of color tinges and color dominants and are similar to the original being copied.

(8) $\overline{V}_{ik}$ = statistical average value of $V_{ik}$ for a large number of originals which are free of color tinges and color dominants and are similar to the original being copied.

(9) $v_{bg}$ = value of the ratio of the transparency of an original in blue to the transparency of the original in green for a localized region or area of the original.

(10) $v_{gr}$ = value of the ratio of the transparency of an original in green to the transparency of the original in red for a localized region or area of the original.

(11) $v_{rb}$ = value of the ratio of the transparency of an original in red to the transparency of the original in blue for a localized region or area of the original.

(12) $v_{ik}$ = value of the ratio of the transparency of an original in color i to the transparency of the original in color k for a localized region or area of the original.

The invention is based on the assumption that an above average deviation of a transparency ratio of an original from the average of the transparency ratio for a large number of originals can be caused by two different factors as follows:

(a) The original may have a color tinge. In other words, when the original is considered as a whole, one of the primary colors is more prevalent than in an average original.

(b) The original may have a color dominant. In other words, the original may have a localized distribution of the primary colors which differs greatly from the statistical average color distribution and results from the subject matter of the original.

These two factors cannot be distinguished by transparency ratios which are based on the overall transparencies of the original in the three primary colors. If a color dominant is present, use of the overall transparencies will lead to incorrect exposures. The copies will have color tinges when the copying arrangement is adjusted on the basis of the overall transparencies, i.e., when the magnitude of the correction factor is such that originals having color tinges yield neutral gray copies. It follows that a constant correction factor cannot be used since, depending upon the magnitude of the correction factor, copies with color tinges will then be obtained either for all originals having color tinges or for all originals having color dominants.

In order to determine whether an original has unusual transparency ratios, that is, whether one or more of the primary colors are present to a distinctly larger degree than in an average original which is readily copied, the statistical average values $\overline{V}_{bg}$, $\overline{V}_{gr}$ and $\overline{V}_{rb}$ are, in accordance with the invention, obtained from a large number of originals having neither color tinges nor color dominants. These statistical average values constitute reference values. The overall or average transparency of the original to be copied is measured in each of the three primary colors. The overall or average transparency values $V_{bg}$, $V_{gr}$ and $V_{rb}$ for the original to be copied are formed from the measured transparencies. Each of the average transparency ratios for the original is compared with the corresponding statistical average transparency ratio. As long as the average transparency ratios of the original to be copied deviate only slightly from the respective statistical average transparency ratios, it is not necessary to distinguish between color tinges and color dominants. The reason is that, within a certain range $\pm D$ of the average statistical transparency ratios, the exposure errors which arise when an original having a color dominant is copied using a neutral gray correction factor, i.e., a correction factor which yields a neutral gray copy for an original having a color tinge, produce only negligible color tinges in the copies. In other words, as long as $V_{ik}$ lies within the range $\overline{V}_{ik} \pm D$, the copies obtained with a neutral gray correction factor are sufficiently good both for originals with color tinges and originals with color dominants to make a distinction between color tinges and color dominants unnecessary. When the average transparency ratios of the original to be copied fall outside of the range $\pm D$ about the respective statistical average transparency ratios, the exposure error for an original having a color dominant becomes so large when a neutral gray correction factor is used that it is necessary to distinguish between color tinges and color dominants. The value of D can be optimized.

In the method according to the invention, the deviations of the average transparency ratios of the original from the statistical average transparency ratios serve as criteria which determine whether or not it is necessary to distinguish between a color tinge and a color dominant for the original. This is illustrated in FIG. 1 which represents the Gaussian distribution to be expected for the average transparency ratios $V_{ik}$ of a large number of originals. FIG. 1 shows the statistical average transparency ratio $\overline{V}_{ik}$ as well as the limits $\overline{V}_{ik} \pm D$. When each of the average transparency ratios $V_{bg}$, $V_{gr}$ and $V_{rb}$ of an original lies within a range of $\pm D$ of the corresponding statistical average transparency ratio, there is no need to distinguish between a color tinge and a color dominant. Such an original can be copied using a conventional neutral gray correction factor. On the other hand, if even one of the average transparency ratios $V_{bg}$, $V_{gr}$ and $V_{rb}$ of the original lies outside of the range $\pm D$ about the corresponding statistical average transparency ratio, it is necessary to distinguish between a color tinge and a color dominant using a statistical method.

It is assumed that the transparency ratios $v_{bg}$, $v_{gr}$ and $v_{rb}$ for localized regions of the original have an approximately Gaussian distribution about the respective average transparency ratios $V_{bg}$, $V_{gr}$ and $V_{rb}$ of the original. The solid curve in FIG. 2A illustrates such a distribution about the point I for an original which is free of color tinges and color dominants.

If the original has a color tinge, the distribution curve for the transparency ratios of the localized regions of the original, as well as the corresponding average transparency ratio $V_{ik}$ of the original, shift by an amount which is related to the intensity of the color tinge. This is illustrated by the dashed curve in FIG. 2A. It will be observed that the average transparency ratio $V_{ik}$ of the original is displaced from the point I to the point II. The color tinge thus causes a shift in the average transparency ratio $V_{ik}$ of the original relative to the corresponding statistical average transparency ratio $\overline{V}_{ik}$.

Figure 2B:
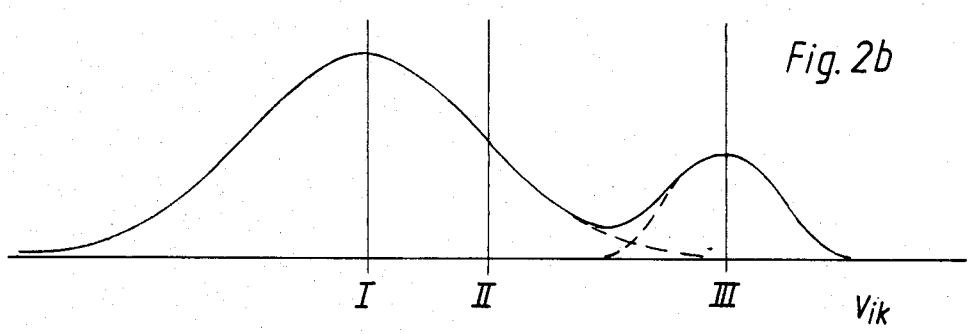

A shift in the average transparency ratios $V_{bg}$, $V_{gr}$ and $V_{rb}$ of the original relative to the respective statistical average transparency ratios $\overline{V}_{bg}$, $\overline{V}_{gr}$ and $\overline{V}_{rb}$ can also be caused by a color dominant. This may be recognized, however, as illustrated in FIG. 2B which represents the distribution of the transparency ratios $v_{ik}$ of localized regions of an original having a color dominant. For the portions of the original located outside of the region of the color dominant, an approximately Gaussian distribution exists about the point or maximum I which represents the average transparency ratio $V_{ik}$ of the original in the absence of color tinges and color dominants. A somewhat narrower, approximately Gaussian distribution corresponding to the region of the color dominant exists about a second point or maximum III located to one side of the point I. The solid curve in FIG. 2B represents the sum of the two distributions. It will be observed that the average transparency ratio $V_{ik}$ of the original with the color dominant is represented by the point II or, in other words, is the same as the average transparency ratio $V_{ik}$ of the original of FIG. 2A having the color tinge.

Figure 2C:
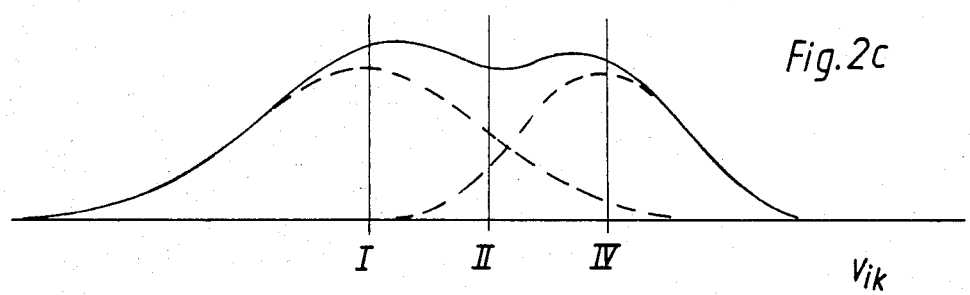

FIG. 2C illustrates the distribution of the transparency ratios $v_{ik}$ of localized regions of an original having a color dominant different from that of the original of FIG. 2B. An approximately Gaussian distribution again exists about the point I for the portions of the original located outside of the region of the color dominant. A similar but narrower distribution exists about the point IV in the region of the color dominant. The solid curve of FIG. 2C represents the sum of the two distributions. The average transparency ratio $V_{ik}$ of the original is, as before, located at the point II.

FIGS. 2A–2C illustrate that the widths of the distributions of the transparency ratios $v_{ik}$ of the localized regions are different for originals having color tinges and color dominants. This difference makes it possible to distinguish between an original with a color tinge and an original with a color dominant.

Figure 3A:
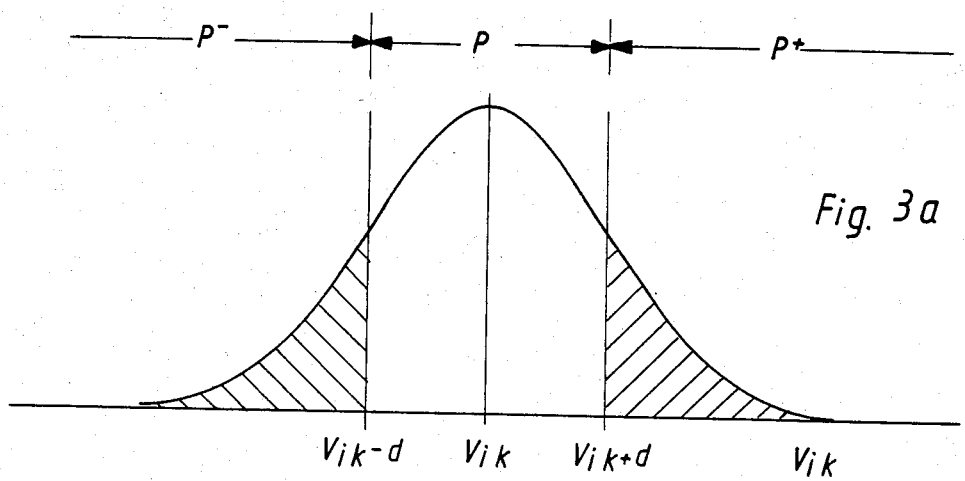
FIGS. 3A–3C respectively correspond to FIGS. 2A–2C and illustrate one manner of distinguishing between a color tinge and a color dominant.
Figure 3B:
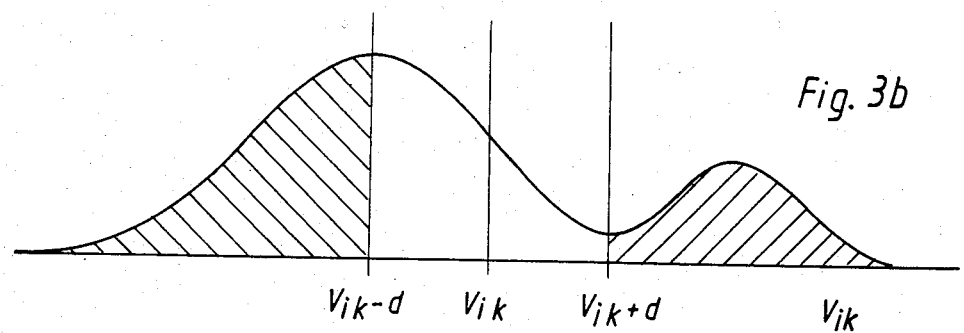
Figure 3C:
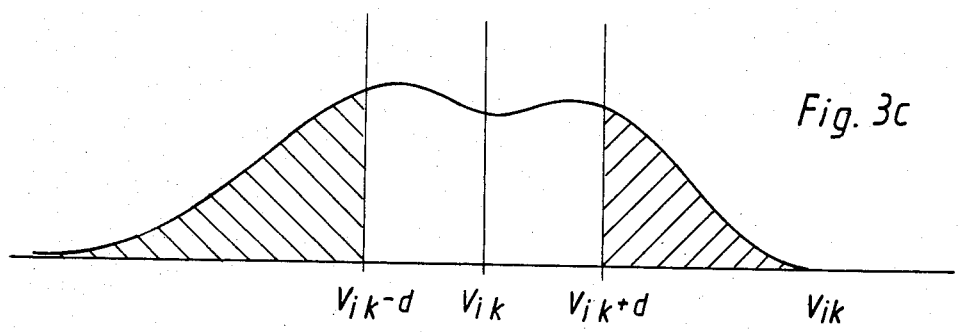

One manner of accomplishing this is illustrated in FIGS. 3A–3C. FIG. 3A shows the dashed curve of FIG. 2A while FIGS. 3B and 3C respectively show the solid curves of FIGS. 2B and 2C.

In order to distinguish between a color tinge and a color dominant, the curves of FIGS. 3A–3C are divided into three sections as follows:

(1) Section P: $V_{ik} - d \leq v_{ik} \leq V_{ik} + d$, where $V_{ik}$ corresponds to the point II of FIGS. 2A–2C and represents the average transparency ratio of the original.

(2) Section P−: $v_{ik} < V_{ik} - d$.

(3) Section P+: $v_{ik} > V_{ik} + d$.

The value of d is selected in such a manner that, in an average original which is free of color dominants, the number of localized regions having transparency ratios $v_{ik}$ outside of the respective ranges $V_{ik} \pm d$ is approximately equal to the number of localized regions having transparency ratios $v_{ik}$ within such ranges, e.g., the number of localized regions having a transparency ratio $v_{bg}$ outside of the range $V_{bg} \pm d$ is approximately equal to the number of localized regions having a transparency ratio $v_{bg}$ within this range.

If the total number of localized regions in an original is N, the following relationship holds for each transparency ratio $v_{ik}$:

$$N = N_{ik}^- + N_{ik}^+ + N_{ik},$$

where $N_{ik}^-$ = number of localized regions having a transparency ratio $v_{ik}$ in section P−, $N_{ik}^+$ = of localized regions having a transparency ratio $v_{ik}$ in the section P+, $N_{ik}$ = number of localized regions having a transparency ratio $v_{ik}$ in the section P.

i = b, g, r
k = g, r, b

A classification value $C_{ik}$ for each transparency ratio $v_{ik}$ may, for example, be formulated as follows:

$$C_{ik} = N_{ik}^- + N_{ik}^+ - N_{ik}$$

For each of the classification values $C_{bg}$, $C_{gr}$ and $C_{rb}$, a determination is made as to whether such value is greater or less than zero. If the classification value $C_{ik}$ is greater than zero, most of the localized regions have a transparency ratio $v_{ik}$ outside of the range $V_{ik} \pm d$ and a color dominant is most likely present. If the classification value $C_{ik}$ is less than zero, most of the localized regions have a transparency ratio $v_{ik}$ within the range $V_{ik} \pm d$. A color tinge is then present inasmuch as the comparisons between the average transparency ratios $V_{ik}$ of the original and the respective statistical average transparency ratios $\overline{V}_{ik}$ indicated a significant color imbalance.

Another manner of distinguishing between a color tinge and a color dominant is to sum the differences between each of the average transparency ratios $V_{bg}$, $V_{rg}$, $V_{rb}$ and the corresponding transparency ratios $v_{bg}$, $v_{gr}$, $v_{rb}$ of the localized regions. This yields three sums, namely, a sum for each of the three color combinations blue-green, green-red and red-blue. Each sum is compared with an average of similar sums pertaining to the same color combination and obtained from a large number of originals free of dominants. When a sum for the original to be copied exceeds the corresponding average sum by more than a predetermined amount, e.g., by more than 10%, a color dominant is assumed to be present.

When a color dominant is assumed to be present in an original, the original is copied using a color correction factor which is smaller than the neutral gray correction factor employed for a color tinge, i.e., the original is copied with under-correction. For example, the correction factor employed for an original having a color dominant may be 50% of the neutral gray correction factor.

Figure 4:
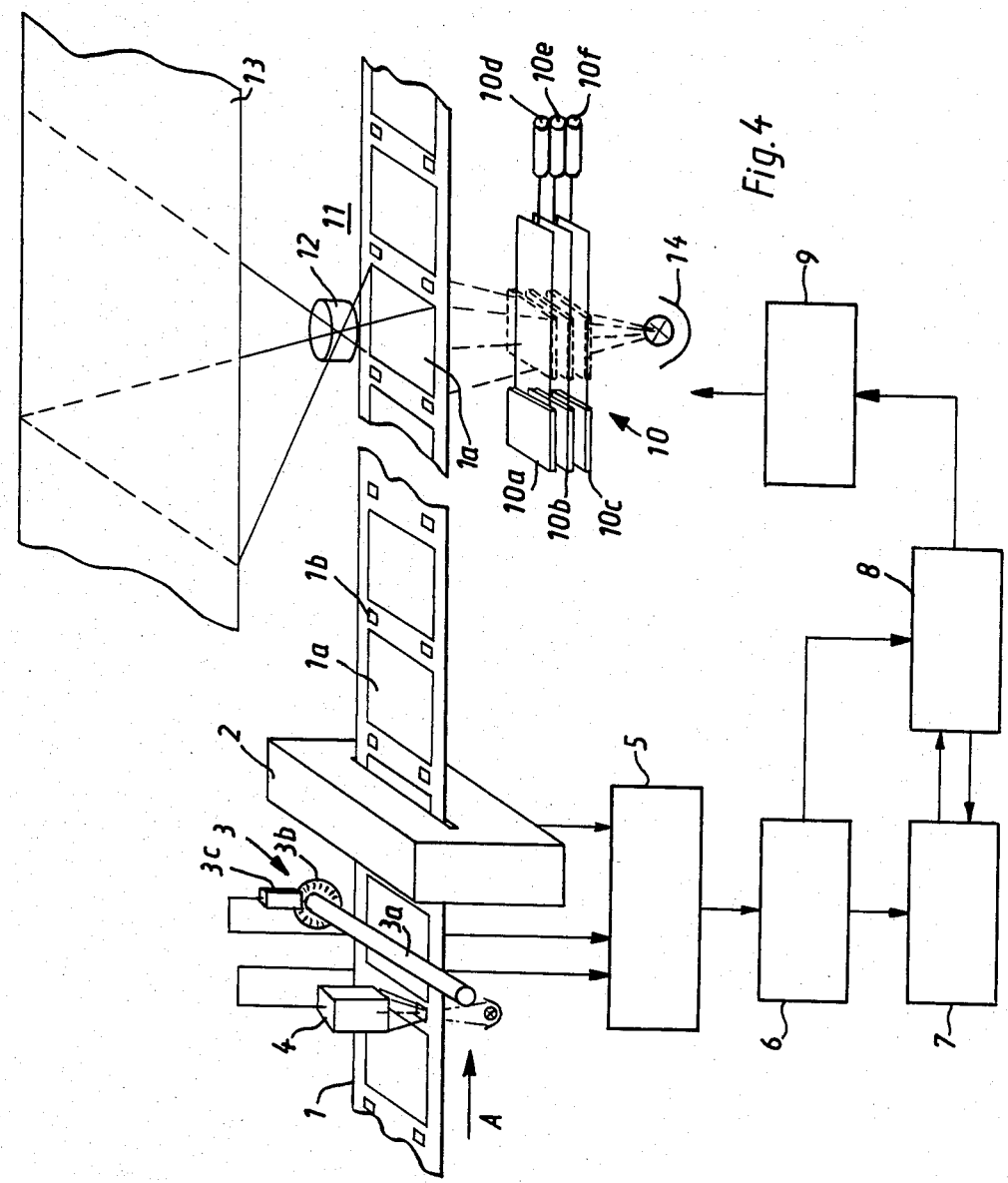
FIG. 4 illustrates a color copying arrangement in accordance with the invention.

FIG. 4 illustrates a copying arrangement according to the invention. An exposed and developed film strip 1 having a plurality of originals 1a to be copied is advanced in the direction of the arrow A by means of non-illustrated rollers or the like. Marks 1b are arranged on either side of each original 1a. The marks 1b are capable of being detected and define boundaries which enable adjacent ones of the originals 1a to be distinguished from one another. The marks 1b may, for instance, be in the form of perforations such as are present in 110 mm and 126 mm film. The marks 1b may also be in the form of notches located at the edges of the film strip 1 between adjacent ones of the originals 1a. Such notches might be provided for 135 mm film and may be formed after exposure and development of the film.

The copying arrangement includes a detecting device 4 such as, for instance, a light barrier, which detects the marks 1b. The detecting device 4 is connected to a measuring transducer 5 and transmits signals to the latter each time a set of marks 1b passes by the detecting device 4.

A length measuring device 3 is located downstream of the detecting device 4 and includes a roller 3a which engages the film strip 1 and is caused to rotate by the same. The roller 3a carries a disk 3b which is provided with a plurality of slots. The slots extend radially inwardly from the periphery of the disk 3b and are uniformly spaced in circumferential direction of the disk 3b. A light barrier 3c is arranged to detect the slots in the disk 3b as the latter rotates. The light barrier 3c is connected to the measuring transducer 5 and transmits a pulse to the same every time that the light barrier 3c detects the presence of a slot.

A light measuring device 2 follows the length measuring device 3 in the direction of advance A of the film strip 1. The light measuring device 2 includes rows of photodetectors, e.g., phototransistors or photodiodes, which extend transversely of the direction of advance A of the film strip 1. Each row consists of ten photodetectors which respectively scan 1-10th of the width of an original 1a. As a rule, three rows of photodetectors are arranged adjacent to one another with the photodetectors of each row being sensitive to one of the three primary colors.

The light measuring device 2 functions to measure the transparency or density of an original 1a in each of the three primary colors. Due to the design of the light measuring device 2, groups of ten localized regions of an original 1a are scanned in each of the primary colors at one time. The length measuring device 3 coordinates the operation of the light measuring device 2 with the speed of advance of the film strip 1 in such a manner that an original 1a is entirely scanned in 15 measurements, i.e., each of the rows of photodetectors is activated 15 times during passage of an original 1a through the light measuring device 2. Accordingly, the transparencies or densities of 150 localized regions of an original 1a are measured in each of the three primary colors.

The light measuring device 2 is connected to the measuring transducer 5. The light measuring device 2 transmits signals indicative of the transparencies or densities of the localized regions of an original 1a in each of the three primary colors to the measuring transducer 5. The detecting device 4 functions to provide a correspondence between a given original 1a and the transparency or density values derived from such original 1a.

An input interface 6 is connected to the output of the measuring transducer 5. The input interface 6 delivers the transparency or density information supplied by the measuring transducer 5 to both a memory unit 7 and a computer 8. The memory unit 7 and computer 8 are connected with one another in such a manner that information can be transferred between the same in either direction. By way of example, the computer 8 may be a microprocessor marketed by Digital Equipment Corp. under the designation LSI 11-23.

For each of the originals 1a, the computer 8 withdraws from the memory unit 7 the information required to perform the calculations in the method described previously.

The computer 8 is connected to an output interface 9. The output interface 9 is arranged to transmit pulses to a filtering unit 10 constituting part of a copying station 11. The output interface 9 functions to regulate the filtering unit 10 in dependence upon whether the computer 8 determines that an original 1a to be copied has a color tinge or a color dominant.

The copying station 11 is located a predetermined distance downstream of the light measuring device 2. In addition to the filtering unit 10, the copying station 11 includes a light source 14 for illuminating an original 1a to be copied. An objective lens 12 is arranged to focus the image of such an original 1a on a strip 13 of color copying material.

The filtering unit 10 is located between the light source 14 and the path of the film strip 1. The filtering unit 10 includes three filters 10a, 10b and 10c as well as guides and drives 10d, 10e and 10f for individually moving the filters 10a-10c into and out of the light path between the light source 14 and an original 1a in copying position. The drives 10d-10f may be conventional electromagnets. The filters 10a-10c are designed in such a manner that each terminates the exposure of an original 1a being copied in one of the primary colors when moved between the light source 14 and such original 1a.

The copying arrangement operates as follows:

The film strip 1 is advanced in the direction of the arrow A by non-illustrated rollers or the like. As an original 1a passes through the copying station 11, another original 1a, e.g., the third original 1a behind or upstream of the original 1a passing through the copying station 11, passes through the light measuring device 2. The transparency of the original 1a passing through the light measuring device 2 is measured in each of the three primary colors. As indicated previously, 15 sets of ten measurements each are performed for each of the primary colors. The light measuring device 2 transmits signals representative of the transparency values to the measuring transducer 5. The measuring transducer 5 transfers the transparency values to the memory unit 7 via the input interface 6. The device 4 insures that the transparency values are associated with the original 1a from which they were derived.

The computer 8 first calculates the three transparency ratios $v_{bg}$, $v_{gr}$ and $v_{rb}$ for each of the 150 localized regions of the original 1a. The respective transparency ratios $v_{bg}$, $v_{gr}$ and $v_{rb}$ are summed for the entire original 1a in order to obtain the overall or average transparency ratios $V_{bg}$, $V_{gr}$ and $V_{rb}$ for the original 1a. The average transparency ratios $V_{bg}$, $V_{gr}$ and $V_{rb}$ for the original 1a are respectively compared with the corresponding statistical average values $\overline{V}_{bg}$, $\overline{V}_{gr}$ and $\overline{V}_{rb}$ obtained from a large number of originals similar to the original 1a and stored in the memory unit 7.

If even one of the average transparency ratios for the original 1a deviates from the corresponding statistical average transparency ratio by an amount more than the magnitude of D, the original 1a is further investigated. To this end, the transparency ratios $v_{bg}$, $v_{gr}$ and $v_{rb}$ for each of the localized regions of the original 1a is compared with the corresponding average transparency ratio $V_{bg}$, $V_{gr}$ and $V_{rb}$ of the original 1a to determine whether the transparency ratios for each of the localized regions differ from the respective average transparency ratios by an amount more or less than the magnitude of d. From the number of localized transparency ratios which lie inside and outside of a range of ±d about the corresponding average transparency ratios, a determination as to whether or not a dominant is present is made for each of the primary colors. In other words, a determination is made as to whether the distribution of localized transparency ratios about the respective average transparency ratios is wider than in an original which is free of dominants.

If a color tinge rather than a color dominant is present, the original 1a to be copied is handled in precisely the same manner as an original having an average color distribution, that is, the original 1a is copied in accordance with the neutral gray principle. Thus, the computer 8 calculates the overall or average density of the original 1a in each of the three primary colors on the basis of the respective sums obtained from the individual measurements made in each color. From these sums, the computer 8 determines the exposure time which is required in each of the three primary colors to obtain a neutral gray copy of the original 1a on the strip 13 of copying material. The exposure times are stored until the original 1a enters the copying station 11. When the exposure of the original 1a in one of the primary colors is to be terminated, the output interface 9 sends a signal to the appropriate one of the electromagnets 10d-10f which then moves the corresponding one of the filters 10a-10c into the light path between the light source 14 and the original 1a.

If a color dominant is present in the original 1a to be copied, the computer 8 likewise calculates the overall or average density of the original 1a in each of the primary colors. Similarly, the computer 8 again employs these overall or average densities to determine the exposure times of the original 1a in the respective colors. However, while the exposure times for a color tinge are computed in such a manner that the different absorptivities of the original 1a for the three primary colors are entirely compensated for, i.e., the exposure times are such as to equalize any differences in absorptivity and achieve a neutral gray copy, the exposure times for a color dominant are computed in such a manner that the differences in absorptivity are only partly compensated for. Accordingly, the correction factor for a color dominant is smaller than that for a color tinge. Depending upon the intensity of the color dominant, which may be ascertained from the number of localized transparency ratios lying inside and outside of a range ±d about the corresponding average transparency ratio of the original 1a, the correction factor for a dominant may be 40 to 70% of the neutral gray correction factor, i.e., an undercorrection is employed for a color dominant. A more precise adjustment of the correction factor to the intensity of the color dominant may be achieved when the widths of the distributions of the localized transparency ratios about the respective average transparency ratios are evaluated. Such an evaluation involves summing the differences between the localized transparency ratios and the corresponding average transparency ratios.

The exposure times calculated for the color dominant are used to regulate the electromagnets $10d$–$10f$ via the output interface 9.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of copying a colored original comprising the steps of:
   (a) deriving a first magnitude and a plurality of second magnitudes for at least one color-dependent parameter of said colored original by sensing selected regions of the latter, said first magnitude being characteristic of at least the major part of said colored original and said second magnitudes respectively being characteristic of said selected regions;
   (b) determining the deviation of said first magnitude form a reference magnitude for said one parameter;
   (c) comparing said first magnitude with said second magnitudes when said deviation exceeds a predetermined amount;
   (d) establishing the probable source of said deviation by calculating a value representative of said probable source from the results of the comparing step and relating said respresentative value to a reference value; and
   (e) copying said colored original under conditions depending upon said probable source.

2. A method as defined in claim 1, wherein said reference magnitude is an average of the first magnitudes of said one parameter for a multiplicity of originals.

3. A method as defined in claim 1, wherein the establishing step comprises differentiating between a color tinge and a color dominant.

4. A method as defined in claim 3, wherein said representative value is the sum of the differences between said first and second magnitudes and said reference value is an average of similar sums for a multiplicity of originals substantially free of color dominants related to said one parameter.

5. A method as defined in claim 4, wherein said probable source is assumed to be a color dominant when said representative value exceeds said reference value by a predetermined percentage.

6. A method as defined in claim 5, wherein said predetermined percentage is approximately 10 percent.

7. A method as defined in claim 1, wherein said selected regions are distributed over essentially the entire said colored original.

8. A method as defined in claim 1, wherein one of said representative and reference values is the number of selected regions having second magnitudes within a predetermined range of said first magnitude and the other of said representative and reference values is the number of selected regions having second magnitudes outside of said predetermined range.

9. A method as defined in claim 8, wherein said probable source is assumed to be a color tinge when said one value exceeds said other value and a color dominant when said other value exceeds said one value.

10. A method as defined in claim 9, wherein said predetermined range is selected in such a manner that said one and other values are approximately equal in an average original substantially free of color dominants related to said one parameter.

11. A method as defined in claim 1, wherein the number of said selected regions is approximately 150.

12. A method as defined in claim 1, wherein the number of said selected regions is 150 and 10 first locations of said colored original are sensed along a first dimension of the same while 15 second locations of said colored original are sensed along a second dimension of the same at each of said first locations.

13. A method as defined in claim 1, wherein said one parameter is a ratio of characteristic values of said colored original in two primary colors.

14. A method as defined in claim 13, wherein said characteristic values are representative of the transparency of said colored original in the respective colors.

15. A method as defined in claim 13, wherein two additional color-dependent parameters are established each having an additional first magnitude characteristic of at least the major part of said colored original and a plurality of additional second magnitudes which are respectively characteristic of said selected regions, each of said additional parameters being a ratio of characteristic values of said colored original in two primary colors, and each of said parameters representing a different color combination, the comparing and establishing steps being performed for said additional parameters when said deviation exceeds said predetermined amount.

16. A method as defined in claim 15, wherein the determining step is performed for said additional parameters.

17. A method as defined in claim 15, wherein the copying step comprises regulating the amount of copying light in each of the three primary colors.

18. A method as defined in claim 15, wherein one of the representative and reference values for each of said parameters is the number of selected regions having second magnitudes within a predetermined range of the respective first magnitude and the other of the representative and reference values is the number of selected regions having second magnitudes outside of the respective predetermined range.

19. A method as defined in claim 18, wherein the probable cause corresponding to a parameter is assumed to be a color tinge when the one value for the parameter exceeds the respective other value and a color dominant when the other value exceeds the one value.

20. A method as defined in claim 19, wherein each predetermined range is selected in such a manner that the corresponding one and other values are approximately equal in an average original substantially free of color dominants related to the respective parameter.

21. A method as defined in claim 15, wherein the establishing step for each of said parameters comprises differentiating between a color tinge and a color dominant.

22. A method as defined in claim 21, wherein the representative value for each of said parameters is the sum of the differences between the respective first and second magnitudes and the reference value for each of said parameters is an average of similar sums for a multiplicity of originals substantially free of color dominants related to the respective parameter.

23. A method as defined in claim 22, wherein the probable source corresponding to a parameter is assumed to be a color dominant when the respective representative value exceeds the corresponding reference value by a predetermined percentage.

24. A method as defined in claim 23, wherein said predetermined percentages are approximately 10 percent.

25. A method as defined in claim 21, wherein the establishing steps indicate the probable absence of color dominants and the copying step is performed using a correction factor which results in a substantially neutral gray copy.

26. A method as defined in claim 21, wherein the establishing steps indicate the probable presence of a color dominant and the copying step is performed using a correction factor smaller than that which results in a substantially neutral gray copy.

27. An arrangement for copying a colored original comprising:
(a) sensing means for sensing selected regions of the colored original and emitting signals representative of a characteristic of the colored original in a primary color;
(b) processing means arranged to receive the signals from said sensing means and to:
(i) derive from the signals a first magnitude and a plurality of second magnitudes for at least one color-dependent parameter of the colored original, the first magnitude being characteristic of at least the major part of the colored original and the second magnitudes respectively being characteristic of the selected regions;
(ii) determine the deviation of the first magnitude from a reference magnitude for the one parameter;
(iii) compare the first and second magnitudes when the deviation exceeds a predetermined amount;
(iv) calculate a value representative of the probable source of the deviation from the results of the comparison between the first and second magnitudes;
(v) establish the probable source by relating the representative value to a reference value; and
(vi) copying means responsive to said processing means for copying the colored original under conditions depending upon the probable source of the deviation.

28. An arrangement as defined in claim 27, wherein said processing means comprises a memory for storing the magnitudes of the one parameter, and a computer connected with said memory.

29. An arrangement as defined in claim 28, wherein said sensing means is connected with both said memory and said computer.

30. An arrangement as defined in claim 27, wherein said sensing means is designed to emit signals representative of a characteristic of the colored original in each of the three primary colors, said processing means being designed to derive the one parameter and two additional parameters by forming three different ratios of characteristic values of the colored original in the primary colors, and the additional parameters each having an additional first magnitude characteristic of at least the major part of the colored original and a plurality of additional second magnitudes which are respectively characteristic of the selected regions, said processing means also being designed to perform the comparing, calculating and establishing operations for the additional parameters when the deviation between the first and reference magnitudes of the one parameter exceeds the predetermined amount.

31. An arrangement as defined in claim 27, wherein said sensing means is designed to emit signals representative of the transparency of the colored original in a primary color.

32. An arrangement as defined in claim 27, wherein said processing means is designed to establish whether the probable source of the deviation is a color tinge or a color dominant.

33. An arrangement as defined in claim 27, wherein said sensing means is designed to scan the colored original substantially in its entirety.

34. An arrangement as defined in claim 27, wherein said processing means is designed to calculate the value representative of the probable source of the deviation by summing the differences between the first and second magnitudes of the one parameter.

35. An arrangement as defined in claim 27, wherein said processing means is designed to calculate the value representative of the probable source of the deviation by counting the number of selected regions having second magnitudes within a predetermined range of the first magnitude of the one parameter and outside of the predetermined range.

36. A method of copying a colored original comprising the steps of:
(a) measuring the transparencies of selected regions of said colored original in each of the primary colors, said selected regions being distributed over substantially the entire colored original;
(b) forming a plurality of first ratios for said colored original overall, said first ratios having respective first magnitudes, and each of said first ratios being the quotient of the overall transparencies of said colored original in two primary colors;
(c) forming a plurality of second ratios from each of said regions, said second ratios having respective second magnitudes, and each of said second ratios being the quotient of the transparencies of the respective region in two primary colors, each first ratio having a corresponding second ratio for each of said regions;

(d) determining the deviation of each of said first magnitudes from a respective reference magnitude representing an average of the corresponding first ratio for a large number of colored originals;
(e) comparing each of said first magnitudes with the respective second magnitudes when at least one of said deviations exceeds a predetermined amount;
(f) establishing whether the probable source of said one deviation is a color tinge or a color dominant by calculating a value representative of said probable source from the results of the comparing step and relating said representative value to a reference value; and
(g) copying said colored original under conditions depending upon said probable source.

37. A method as defined in claim 36, wherein one of said representative and reference values is the number of selected regions having respective second magnitudes within a predetermined range of the first magnitude associated with said one deviation and the other of said representative and reference values is the number of selected regions having respective second magnitudes outside of said predetermined range, said probable source being assumed to be a color tinge when said one value exceeds said other value and a color dominant when said other value exceeds said one value.

38. An arrangement for copying a colored original comprising:
(a) sensing means for measuring the transparencies of selected regions distributed over substantially the entire colored original, said sensing means being designed to measure the transparencies in each of the primary colors and to emit signals representative of the transparencies;
(b) processing means arranged to receive the signals from said sensing means and to:
(i) form a plurality of first ratios for the colored original overall, the first ratios having respective first magnitudes, and each of the first ratios being the quotient of the overall transparencies of the colored original in two primary colors;
(ii) form a plurality of second ratios for each of the selected regions, the second ratios having respective second magnitudes, and each of the second ratios being the quotient of the transparencies of the respective region in two primary colors, each first ratio having a corresponding second ratio for each selected region;
(iii) determine the deviation of each first magnitude from a respective reference magnitude representing an average of the corresponding first ratio for a large number of colored originals;
(iv) compare each of the first magnitudes with the respective second magnitudes when at least one of the deviations exceeds a predetermined amount;
(v) calculate a value which is based on the results of the comparison between the first and second magnitudes and is representative of whether the probable source of the one deviation is a color tinge or a color dominant;
(vi) establish whether the probable source is a color tinge or a color dominant by relating the representative value to a reference value; and
(c) copying means responsive to said processing means for copying the colored original under conditions depending upon the probable of the one deviation.

39. An arrangement as defined in claim 38, wherein said processing means is designed to calculate the representative value by counting the number of selected regions having respective second magnitudes within the outside of a predetermined range of the first magnitude associated with the one deviation.

40. An arrangement as defined in claim 38, wherein said processing means comprises a memory for storing the first and second magnitudes, and a computer connected with said memory, said sensing means being connected with both said memory and said computer.

* * * * *